Feb. 27, 1934. J. V. CURRAN 1,948,842
FILM EDITOR
Filed Oct. 1, 1932
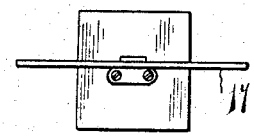
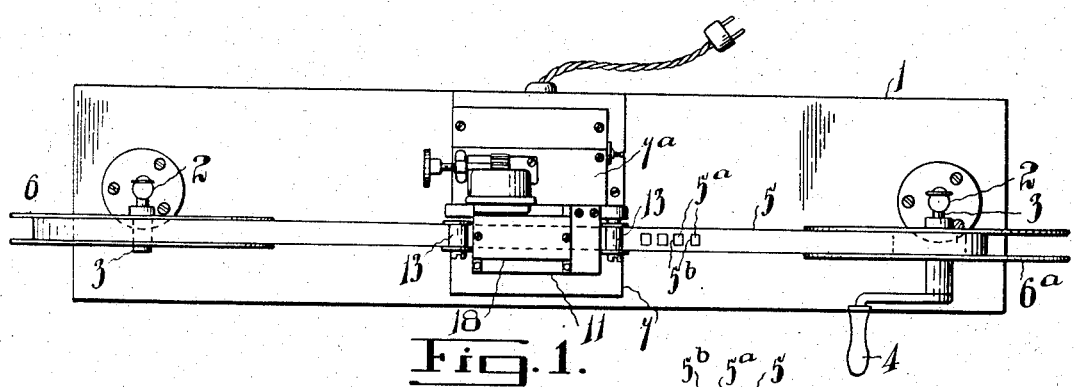
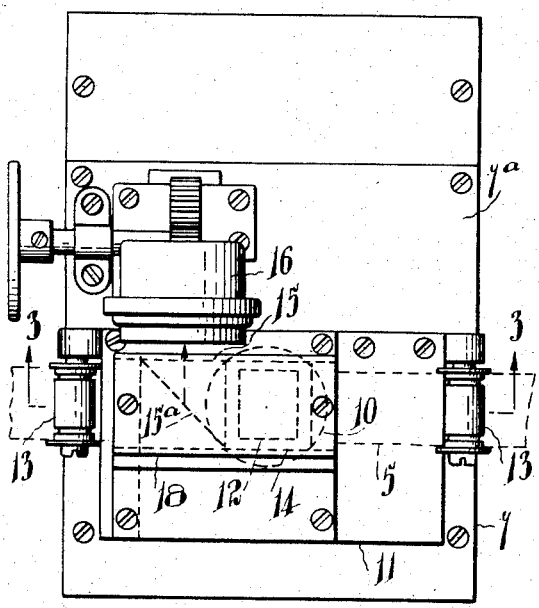
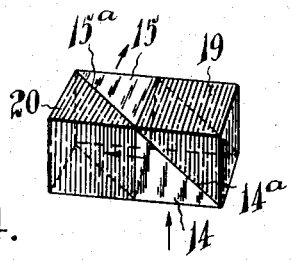
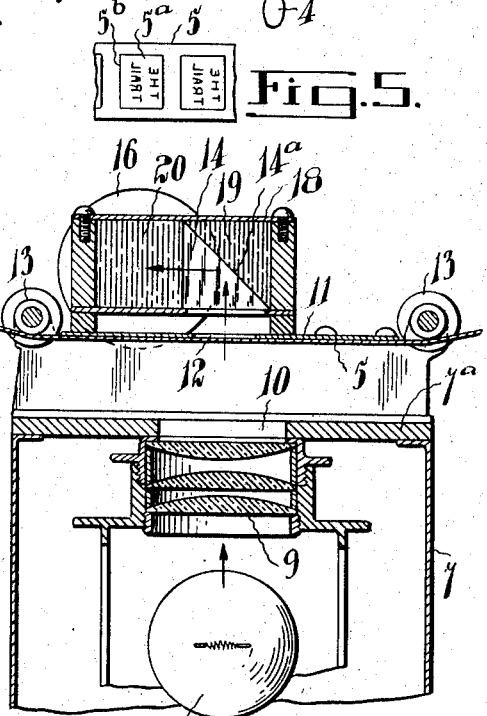
Inventor
J. V. Curran
by J. Edw. Maybee
ATTY.

Patented Feb. 27, 1934

1,948,842

UNITED STATES PATENT OFFICE 1,948,842

FILM EDITOR

John V. Curran, Toronto, Ontario, Canada

Application October 1, 1932. Serial No. 635,729

2 Claims. (Cl. 88—24)

This invention relates to film editors which are used for inspecting films not only for faults but for properly arranging different series of pictures to provide proper sequence thereof in the final film. Heretofore this has been done by passing the film horizontally over a light and inspecting it by the use of a magnifying glass. The object of the present invention is to provide simple apparatus for passing a strip of film horizontally beneath the line of vision of an operator for ready accessibility thereto and for projecting the images of the pictures on the film on to a vertical screen in the line of vision of the operator for inspection.

I attain my objects by passing a strip of film horizontally above a source of light and positioning two prisms above said film, one prism being adapted to reflect the rays from the illumined picture on the film in a horizontal direction and the other being adapted to correct the position of the reflected image by deflecting it in substantially the same plane but substantially at right angles into a projecting lens. The latter projects the image on a substantially vertical screen positioned at one side of the film.

The constructions are hereinafter more fully described and are illustrated in the accompanying drawing in which Fig. 1 is a plan view of my film editor;

Fig. 2 is a plan view, on an enlarged scale, of the reflecting and projecting apparatus;

Fig. 3 a cross-section on the line 3—3 in Fig. 2;

Fig. 4 a perspective detail of the reflecting prisms; and

Fig. 5 a detail of part of a strip of film.

In the drawing like numerals of reference indicate corresponding parts in the different figures.

At opposite ends of a base 1 are mounted two reel standards 2 in which the usual reel carrying spindles 3 are journalled. The spindles project laterally from the standards and a crank 4 is adapted to be engaged with either of the spindles so that a roll of film 5 may be transferred from the reel 6 to the reel 6ª or vice versa.

A lamp housing 7 is secured to the base 1 between the standards 2 and in the housing are suitably positioned the usual lamp 8, reflector (not shown) and condenser lens or lenses 9. The top 7ª of the housing is provided with an opening 10 and above it is carried a horizontally disposed table 11 having an aperture 12 in register with the opening 10 and lens 9. The portion of the film strip 5 passing from one reel to the other is guided by flanged rollers 13 across the underside of the table 11 so that the pictures 5ª on the film will register with the aperture 12.

Above the table 11 are suitably carried two isosceles right angled triangular prisms 14, 15. The prism 14 is positioned above the aperture 12 with its reflecting surface 14ª at an angle of 45° to the horizontal surface of the film strip 5 so that the vertical rays from the illumined picture will be reflected horizontally to form an image in a vertical plane. The prism 15 is positioned back to back with the prism 14 and the reflecting surface 15ª of the prism 15 is at an angle of 45° to the edge of the film strip 5 so that the horizontal rays reflected by the prism 14 will be deflected in substantially the same plane but at right angles to the direction of travel of the film strip.

The bottom side 5ᵇ of each picture 5ª is transverse to the film strip and, when the picture is in register with the aperture 12, is at the left hand side of the beam of light from the lamp 8. The bottom side 5ᵇ will thus be at the top of the image formed by the rays reflected by the prism 14 but the right and left sides of the said image will correspond to the right and left sides of the picture. The deflection of the said image by the prism 15 results in the right and left sides of the said image being transposed without changing the image in a vertical plane so that the top of the image is still a reflection of the bottom side 5ᵇ of the picture but the right side of the picture is now at the left side of the image and the left side of the picture is at the right side of the image.

A projecting lens 16 is adjustably mounted on the housing top 7ª with its optical axis in alinement with the center of the rays reflected from the prism 15 and is adapted to project the image on to a vertical screen 17 positioned at one side of the film. The prisms 14 and 15 may be mounted in a rectangular casing 18 and readily positioned therein by employing correspondingly shaped filler pieces 19, 20 of opaque material such as bakelite to fill in the gaps between the prisms and the casing. The bakelite pieces thus contact with the prisms along their reflecting surfaces.

With this apparatus the operator merely looks at the screen which is in his line of vision while cranking the wind-up reel 6 or 6ª. As the picture beneath the aperture 12 is the picture being projected there is no difficulty in establishing which particular picture is defective or the correct place to make an insertion. The table 11 is spaced sufficiently above the top 7ª of the lamp housing 7 to provide clearance for the operator's fingers to grasp the film strip at the desired place and withdraw the strip laterally from beneath the table. The usual splicing and other correcting devices will be positioned in front of the operator for ready access.

What I claim as my invention is:

1. A film editor comprising a horizontally disposed table having an aperture therein; means for passing translucent pictures on a strip of film along the table beneath said aperture; a source of light beneath the aperture for illuminating the pictures as they are brought into register with the aperture; a projecting lens having its optical axis disposed at right angles to the axis of the aperture and offset relative thereto longitudinally of the film strip; a prism positioned relative to the aperture for reflecting the image forming rays from each of the pictures a second prism positioned relative to the projecting lens and the first mentioned prism for reflecting the image rays from the latter into the projecting lens; and a vertical screen positioned at the rear of the table and in front of the projecting lens so that the projected images will follow one another vertically on the screen behind the horizontal film.

2. A film editor comprising a lamp housing having a horizontally disposed top, the top being provided with an opening; a table horizontally mounted above said top and provided with an aperture in alinement with said opening; means for passing translucent pictures on a strip of film along the underside of the table beneath the aperture; a source of light mounted within the housing beneath the opening for illuminating the pictures as they are brought into register with the aperture; a projecting lens carried by the top and having its optical axis disposed at right angles to the axis of the aperture and offset relative thereto longitudinally of the film strip; a prism positioned relative to the aperture for reflecting the image forming rays from each of the pictures; a second prism positioned relative to the projecting lens and the first mentioned prism for reflecting the image rays from the latter into the projecting lens; and a vertical screen positioned at the rear of the table and in front of the projecting lens so that the projected images will follow one another vertically on the screen behind the horizontal film, the table being spaced above the said top a sufficient distance to enable the operator to grasp the film strip with his fingers on the picture being illumined.

JOHN V. CURRAN.